(12) United States Patent
Akagi et al.

(10) Patent No.: US 11,614,525 B2
(45) Date of Patent: Mar. 28, 2023

(54) DETERMINATION DEVICE AND CONTROL METHOD OF DETERMINATION DEVICE

(71) Applicant: OMRON Corporation, Kyoto (JP)

(72) Inventors: Tetsuya Akagi, Kyoto (JP); Xiaoguang Ning, Otsu (JP)

(73) Assignee: OMRON Corporation, Kyoto (JP)

( * ) Notice: Subject to any disclaimer, the term of this patent is extended or adjusted under 35 U.S.C. 154(b) by 933 days.

(21) Appl. No.: 16/219,920

(22) Filed: Dec. 13, 2018

(65) Prior Publication Data

US 2019/0271768 A1    Sep. 5, 2019

(30) Foreign Application Priority Data

Mar. 1, 2018   (JP) .............. JP2018-036808

(51) Int. Cl.
| | |
|---|---|
| *G01S 7/497* | (2006.01) |
| *G01S 17/87* | (2020.01) |
| *G08B 13/183* | (2006.01) |
| *G08B 13/196* | (2006.01) |
| *G01S 17/88* | (2006.01) |
| *G01S 17/04* | (2020.01) |
| *G01S 17/18* | (2020.01) |

(52) U.S. Cl.
CPC .............. *G01S 7/497* (2013.01); *G01S 17/04* (2020.01); *G01S 17/18* (2020.01); *G01S 17/87* (2013.01); *G01S 17/88* (2013.01); *G08B 13/183* (2013.01); *G08B 13/19682* (2013.01)

(58) Field of Classification Search
CPC .......... G01S 7/497; G01S 17/18; G01S 17/04; G01S 17/87; G01S 17/88; G01S 17/06; G01S 7/40; G08B 13/183; G08B 13/19682

See application file for complete search history.

(56) References Cited

U.S. PATENT DOCUMENTS

| | | | |
|---|---|---|---|
| 8,068,051 | B1 | 11/2011 | Osterweil |
| 2010/0194583 | A1 | 8/2010 | Kawabata |
| 2012/0140202 | A1 | 6/2012 | Rothenberger |
| 2016/0306358 | A1 | 10/2016 | Kang et al. |
| 2016/0327649 | A1 | 11/2016 | Albert et al. |

(Continued)

FOREIGN PATENT DOCUMENTS

| | | |
|---|---|---|
| CN | 1444008 | 9/2003 |
| CN | 101441794 | 5/2009 |
| CN | 104515998 | 4/2015 |

(Continued)

OTHER PUBLICATIONS

Office Action of Taiwan Counterpart Application, with English translation thereof, dated Jul. 26, 2019, pp. 1-7.

(Continued)

*Primary Examiner* — Luke D Ratcliffe
(74) *Attorney, Agent, or Firm* — JCIPRNET (57) ABSTRACT

A highly reliable determination device to determine the distance to an object even if general-purpose optical distance measurement modules or the like are used. The determination device determines that an abnormality has occurred in at least one of a plurality of optical distance measurement modules when the distances respectively indicated by the optical distance measurement modules deviate from each other by a predetermined length or more.

3 Claims, 7 Drawing Sheets

(56) References Cited

U.S. PATENT DOCUMENTS

2017/0242126 A1 8/2017 Matsuo et al.
2018/0100929 A1* 4/2018 O'Keeffe ............... G01S 17/931

FOREIGN PATENT DOCUMENTS

| JP | 2000321350 | 11/2000 |
| JP | 2011215776 | 10/2011 |
| JP | 2012221366 | 11/2012 |
| JP | 2015123898 | 7/2015 |
| JP | 2018017617 | 2/2018 |
| KR | 20160123494 | 10/2016 |
| WO | 2015172445 | 11/2015 |

OTHER PUBLICATIONS

"Office Action of Taiwan Counterpart Application", dated Aug. 17, 2020, with English translation thereof, p. 1-p. 13.
"Search Report of Europe Counterpart Application", dated May 24, 2019, p. 1-p. 7.
"Office Action of Japan Counterpart Application", dated Jan. 6, 2021, with English translation thereof, p. 1-p. 5.
Yan Jin, et al., "High-precision laser interferometric displacement measurement system based on LabVIEW." Electronic Mesurement Technology, vol. 4, No. 4, Apr. 2017, pp. 172-177.
"Office Action of Korea Counterpart Application", dated May 11, 2020, with English translation thereof, p. 1-p. 9.
"Office Action of China Counterpart Application", dated Jun. 18, 2020, with English translation thereof, p. 1-p. 16.

* cited by examiner

DETERMINATION DEVICE AND CONTROL METHOD OF DETERMINATION DEVICE

CROSS-REFERENCE TO RELATED APPLICATION

This application claims the priority benefit of Japanese Patent Application serial no. 2018-036808, filed on Mar. 1, 2018. The entirety of the above-mentioned patent application is hereby incorporated by reference herein and made a part of this specification.

BACKGROUND

Technical Field

The disclosure relates to a determination device that outputs a signal indicating intrusion detection when the distance to an object is within a predetermined range.

Description of Related Art

As a device for measuring the distance to a detected object based on the ToF (Time of Flight) principle, for example, Patent Document 1 (Specification of US Patent Application Publication No. 2016/0327649 (Nov. 10, 2016)) discloses an optical distance measurement module that emits light to the detected object with a light emitting element, reads the reflected light with a light receiving element, and performs distance calculation.

When the optical distance measurement module is applied to a safety control-related device that outputs a signal indicating intrusion detection when the distance to the object is within a predetermined range, the safety control-related device needs to be highly reliable. Therefore, it is difficult to realize the above-described conventional technique using a general-purpose optical distance measurement module or the like. For example, there are problems such as the necessity of developing dedicated optical distance measurement IC, etc., higher product cost and development expenses, and complication of the configuration itself.

SUMMARY

A determination device according to an embodiment of the disclosure is a determination device for outputting a signal indicating intrusion detection when a distance to an object is within a predetermined range. The determination device includes: a plurality of acquisition parts each acquiring a signal outputted by each of a plurality of optical distance measurement sensors that are included in a sensor set and have observation areas overlapping each other; a plurality of abnormality determination parts each determining that an abnormality has occurred in at least one of the optical distance measurement sensors when distances respectively indicated by the signals received by the acquisition parts deviate from each other by a predetermined length or more; and an output part outputting a signal indicating the abnormality when at least one of the abnormality determination parts determines that the abnormality has occurred.

Further, a control method of a determination device according to an embodiment of the disclosure is a control method of a determination device for outputting a signal indicating intrusion detection when a distance to an object is within a predetermined range. The control method includes: a plurality of acquisition steps each acquiring a signal outputted by each of a plurality of optical distance measurement sensors that are included in a sensor set and have observation areas overlapping each other; a plurality of abnormality determination steps each determining that an abnormality has occurred in at least one of the optical distance measurement sensors when distances respectively indicated by the signals received in the acquisition steps deviate from each other by a predetermined length or more; and an output step outputting a signal indicating the abnormality when at least one of the abnormality determination steps determines that the abnormality has occurred.

DESCRIPTION OF THE EMBODIMENTS

An embodiment of the disclosure is to realize a highly reliable determination device, which outputs a signal indicating intrusion detection when the distance to an object is within a predetermined range, even if general-purpose optical distance measurement modules or the like are used.

Means for Solving the Problems

According to the above configuration, the determination device determines that an abnormality has occurred in at least one of the optical distance measurement sensors when the distances respectively indicated by the signals outputted by the optical distance measurement sensors included in the sensor set deviate from each other by the predetermined length or more. In other words, the determination device determines whether an abnormality such as malfunction has occurred in at least one of the optical distance measurement sensors included in the sensor set by comparing the distances respectively indicated by the signals outputted by the optical distance measurement sensors that have observation areas overlapping each other. Then, if the determination device determines that an abnormality has occurred in at least one of the optical distance measurement sensors, the determination device outputs a signal indicating abnormality.

In other words, when the determination device determines that an abnormality has occurred in at least one of the optical distance measurement sensors, the output is fixed to the safe side (lockout, for example) and the operation of the machine such as production equipment is stopped. Further, if the determination device determines that no abnormality occurs in any of the optical distance measurement sensors, the determination device executes the normal intrusion detection processing. That is, when the distance to the object is within the predetermined range, a signal indicating intrusion detection is outputted and the operation of the machine such as production equipment is stopped.

Accordingly, the determination device stops the operation of the machine when an abnormality occurs in at least one of the optical distance measurement sensors or when intrusion of the object into the predetermined range is detected, and therefore can achieve high reliability.

In particular, even if the determination device uses optical distance measurement modules such as general-purpose optical distance measurement modules that are not necessarily dedicated for safety control, the determination device stops the operation of the machine such as production equipment when an abnormality occurs in at least one of these optical distance measurement sensors. Therefore, the determination device can achieve high reliability even if it uses general-purpose optical distance measurement modules or the like.

In the determination device according to an embodiment of the disclosure, the optical distance measurement sensor includes a multi-pixel light receiving part including a plurality of light receiving elements. The determination device further includes an extraction part extracting light receiving elements corresponding to an overlapping observation area of the optical distance measurement sensors, among the light receiving elements of the light receiving part, as light receiving elements in a valid range, and each of the abnormality determination parts determines whether the abnormality has occurred in at least one of the optical distance measurement sensors by using signals outputted by the light receiving elements in the valid range.

According to the above configuration, the determination device uses the signals outputted by the light receiving elements corresponding to the overlapping observation area of the optical distance measurement sensors to determine whether an abnormality has occurred in at least one of the optical distance measurement sensors.

Accordingly, the determination device can prevent erroneously determining that an abnormality has occurred when the distances respectively measured by the optical distance measurement sensors in the non-overlapping observation area deviate by the predetermined length or more.

The determination device according to an embodiment of the disclosure may extract the light receiving elements in the valid range according to a distance between the object in the observation area and the optical distance measurement sensor.

The overlapping observation area of the optical distance measurement sensors changes according to the distance from the optical distance measurement sensor. According to the above configuration, the determination device can perform the determination using the signals outputted by the light receiving elements that are capable of performing optical distance measurement in the overlapping observation area in a plurality of optical distance measurement sensors.

In the determination device according to an embodiment of the disclosure, a plurality of the sensor sets are provided, and the signals outputted by the optical distance measurement sensors of each of the sensor sets may be transmitted to each of the acquisition parts by serial transmission.

According to the above configuration, the signal to be outputted is acquired by serial transmission. Therefore, the number of lines of the determination device can be reduced. Thus, it is possible to reduce the manufacturing cost.

Effects

According to an embodiment of the disclosure, it is possible to realize a highly reliable determination device, which outputs a signal indicating intrusion detection when the distance to an object is within a predetermined range, even if general-purpose optical distance measurement modules or the like are used.

Embodiment

Hereinafter, an embodiment according to one aspect of the disclosure (hereinafter, also referred to as "the present embodiment") will be described with reference to the drawings.

§ 1 Application Example

Figure 2:
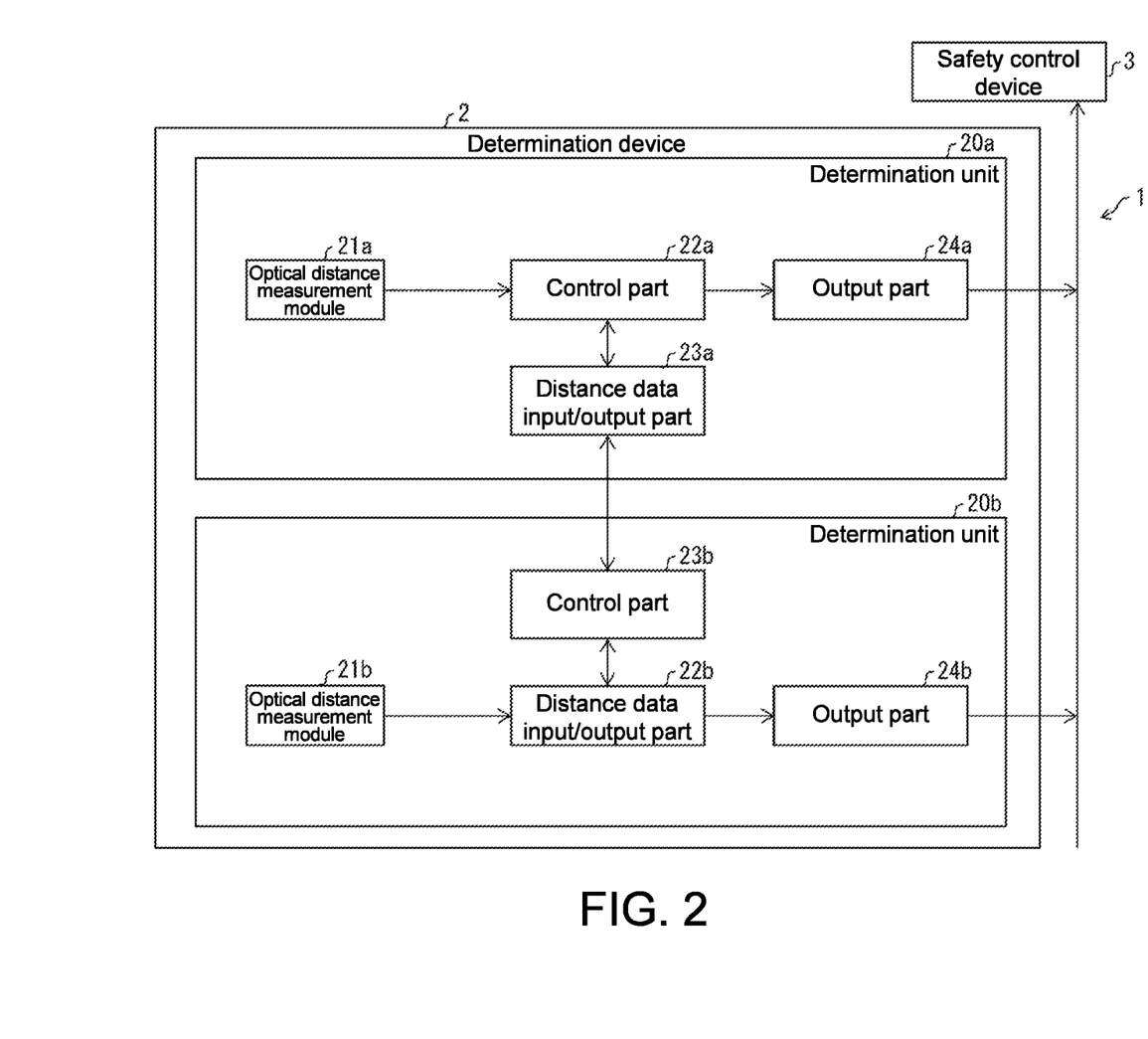
FIG. 2 is a diagram showing an example of application of the determination device according to an embodiment of the disclosure.

FIG. 2 is a diagram showing an example of application of a determination device 2 according to the present embodiment in a safety control system 1. First, an outline of the application example of the determination device 2 will be described with reference to FIG. 2.

The safety control system 1 is a system that stops driving a movable part, such as an end effector of a robot, before a person touches the movable part when detecting that the person approaches the periphery of the movable part, for example. As shown in FIG. 2, the safety control system 1 includes the determination device 2 and a safety control device 3. When receiving a signal indicating intrusion detection from the determination device 2, the safety control device 3 executes safety control and performs control to stop driving the movable part such as the end effector of the robot, for example. In addition, when receiving a signal indicating an abnormality of the determination device 2 (for example, malfunction, etc. of at least one of the optical distance measurement modules 21a and 21b) from the determination device 2, the safety control device 3 executes safety control as in the case of receiving a signal indicating intrusion detection.

The determination device 2 outputs a signal indicating intrusion detection to the safety control device 3 when the distance to an object is within a predetermined range. As shown in FIG. 2, the determination device 2 includes a determination unit 20a and a determination unit 20b each outputting a signal indicating intrusion detection. The determination unit 20a includes an optical distance measurement module 21a, a control part 22a, a distance data input/output part 23a, and an output part 24a. The determination unit 20b has the same configuration as the determination unit 20a. The optical distance measurement module 21a measures the distance to the object under measurement based on the ToF (Time of Flight) principle and outputs a signal indicating the distance to the control part 22a.

Figure 3A:
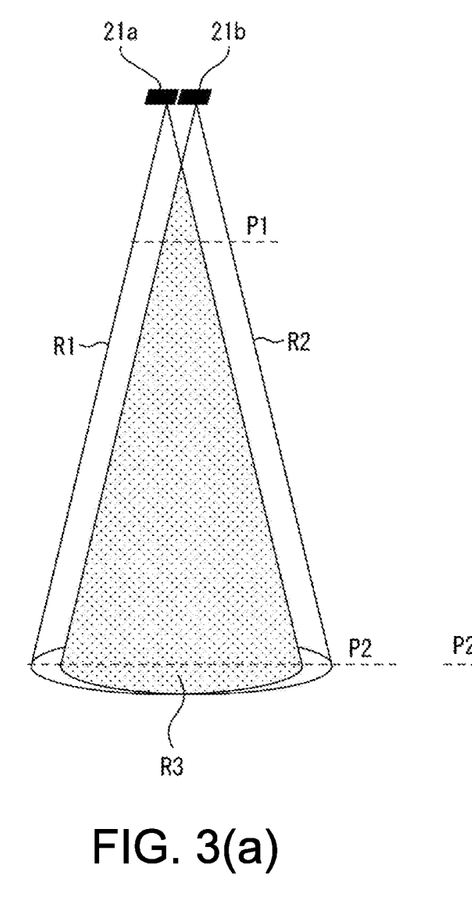
FIG. 3(a) to FIG. 3(c) are diagrams showing the observation area of the optical distance measurement module and the light receiving region of the light receiving part corresponding to the observation area according to an embodiment of the disclosure.
Figure 3B:
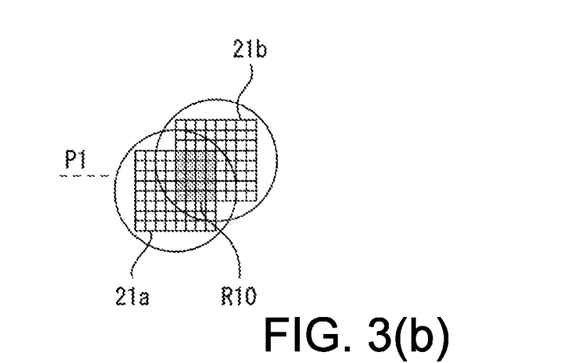
Figure 3C:
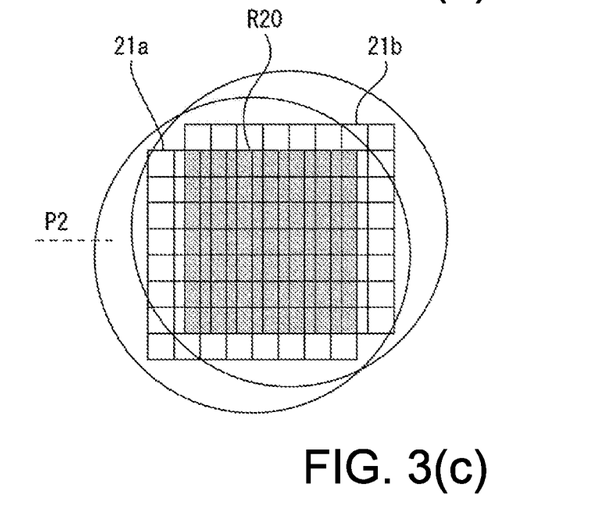

FIG. 3(a) to FIG. 3(c) are diagrams showing an observation area of the optical distance measurement module 21a or 21b and a light receiving region of a light receiving part of the optical distance measurement module 21a or 21b corresponding to the observation area. Details of the light receiving part will be described later. As shown in FIG. 3(a), the optical distance measurement module 21a and the optical distance measurement module 21b are arranged so that the observation area R1 of the optical distance measurement module 21a and the observation area R2 of the optical distance measurement module 21b overlap each other. In FIG. 3(a), the overlapping observation area of the observation areas of the two optical distance measurement modules is shown as R3. That is, the optical distance measurement module 21a and the optical distance measurement module 21b can be regarded as a sensor set with the observation areas overlapping each other.

In the optical distance measurement module 21a, the control part 22a acquires the signal outputted by the optical distance measurement module 21a. In addition, the control part 22a acquires the signal outputted by the optical distance measurement module 21b from the control part 22b via the distance data input/output parts 23a and 23b.

In the optical distance measurement module 21b, the control part 22b acquires the signal outputted by the optical distance measurement module 21b. In addition, the control part 22b acquires the signal outputted by the optical distance measurement module 21a from the control part 22a via the distance data input/output parts 23b and 23a.

(Abnormality Determination Performed by the Control Part)

Each of the control part 22a and the control part 22b determines that an abnormality has occurred in at least one of the optical distance measurement modules 21a and 21b when the distances respectively indicated by the optical distance measurement modules 21a and 21b deviate from each other by a predetermined length or more. When the control part 22a and the control part 22b determine that an abnormality has occurred in at least one of the optical distance measurement modules 21a and 21b, the control part 22a and the control part 22b output signals indicating the abnormality to the safety control device 3 via the output part 24a or the output part 24b.

According to the above configuration, the determination device 2 determines that an abnormality has occurred in at least one of the optical distance measurement module 21a and the optical distance measurement module 21b when the distances respectively indicated by the signals outputted by the optical distance measurement module 21a and the optical distance measurement module 21b included in the sensor set deviate by the predetermined length or more. In other words, by comparing the distances respectively indicated by the signals outputted by the optical distance measurement module 21a and the optical distance measurement module 21b that have observation areas overlapping each other, it is possible to determine whether an abnormality such as malfunction has occurred in at least one of the optical distance measurement module 21a and the optical distance measurement module 21b.

When the determination device 2 determines that an abnormality has occurred in at least one of the optical distance measurement module 21a and the optical distance measurement module 21b, the output to the safety control device 3 is fixed to the safe side (lockout, for example) and the driving of the movable part such as the end effector of the robot is stopped.

Further, if the determination device 2 determines that no abnormality occurs in any of the optical distance measurement module 21a and the optical distance measurement module 21b, the determination device 2 executes the normal intrusion detection processing. In other words, when the distance to the object is within the predetermined range, the determination device 2 outputs a signal indicating intrusion detection to the safety control device 3 and stops the driving of the movable part such as the end effector of the robot.

Accordingly, the determination device 2 stops the operation of the machine when an abnormality occurs in at least one of the optical distance measurement module 21a and the optical distance measurement module 21b or when intrusion of the object into the predetermined range is detected, and therefore can achieve high reliability.

In addition, the optical distance measurement sensor included in the sensor set has a simple configuration. Therefore, a general-purpose optical distance measurement module can be used as the optical distance measurement sensor. According to this configuration, it is possible to provide the user a safety control-related determination device at low cost. In other words, even if the determination device 2 uses optical distance measurement modules such as general-purpose optical distance measurement modules that are not necessarily dedicated for safety control as the optical distance measurement modules 21a and 21b, high reliability can be achieved. Specifically, since the determination device 2 stops the operation of the machine such as production equipment when an abnormality occurs in at least one of the optical distance measurement module 21a and the optical distance measurement module 21b, which are realized by general-purpose optical distance measurement modules, high reliability can be achieved.

Furthermore, when general-purpose optical distance measurement modules that are capable of performing distance calculation are used as the optical distance measurement modules 21a and 21b for the determination device 2, the circuit configuration to be used as the determination device can be simplified. Therefore, the development period of the determination device can be shortened. Even in the case of using general-purpose optical distance measurement modules as the optical distance measurement modules 21a and 21b, when an abnormality occurs in at least one of the optical distance measurement modules 21a and 21b, the determination device 2 outputs a signal indicating the abnormality to the safety control device 3 for the safety control device 3 to execute safety control. Therefore, the determination device 2 can suppress the manufacturing cost and shorten the development period by using general-purpose optical distance measurement modules, for example, while maintaining the high reliability required for safety control.

The "signal indicating intrusion detection" and the "signal indicating abnormality" described above may be the same signal. For example, the "signal indicating intrusion detection" and the "signal indicating abnormality" may be outputted to the safety control device 3 as the signal indicating ON/OFF of safety control by the output signal line of the same hardware.

In particular, the determination device 2 determines whether there is an abnormality according to whether the distances from the object under measurement, which is present in the overlapping observation area R3 of the optical distance measurement modules 21a and 21b, to the respective optical distance measurement modules 21a and 21b deviate from each other by the predetermined length or more.

Therefore, the determination device 2 can prevent "erroneously determining that an abnormality has occurred because the distances respectively measured by the optical distance measurement modules 21a and 21b in a non-overlapping observation area deviate by the predetermined length or more".

(Intrusion Determination Performed by the Control Part)

Each of the control part 22a and the control part 22b determines whether at least one of the signals outputted by the optical distance measurement modules 21a and 21b indicates that the distance to the object in the overlapping observation area R3 is within the predetermined range. The control part 22a and the control part 22b output a signal indicating intrusion detection to the safety control device 3 via the output part 24a or the output part 24b according to the result of the determination.

§ 2 Configuration Example (Determination Device 2)

Figure 1:
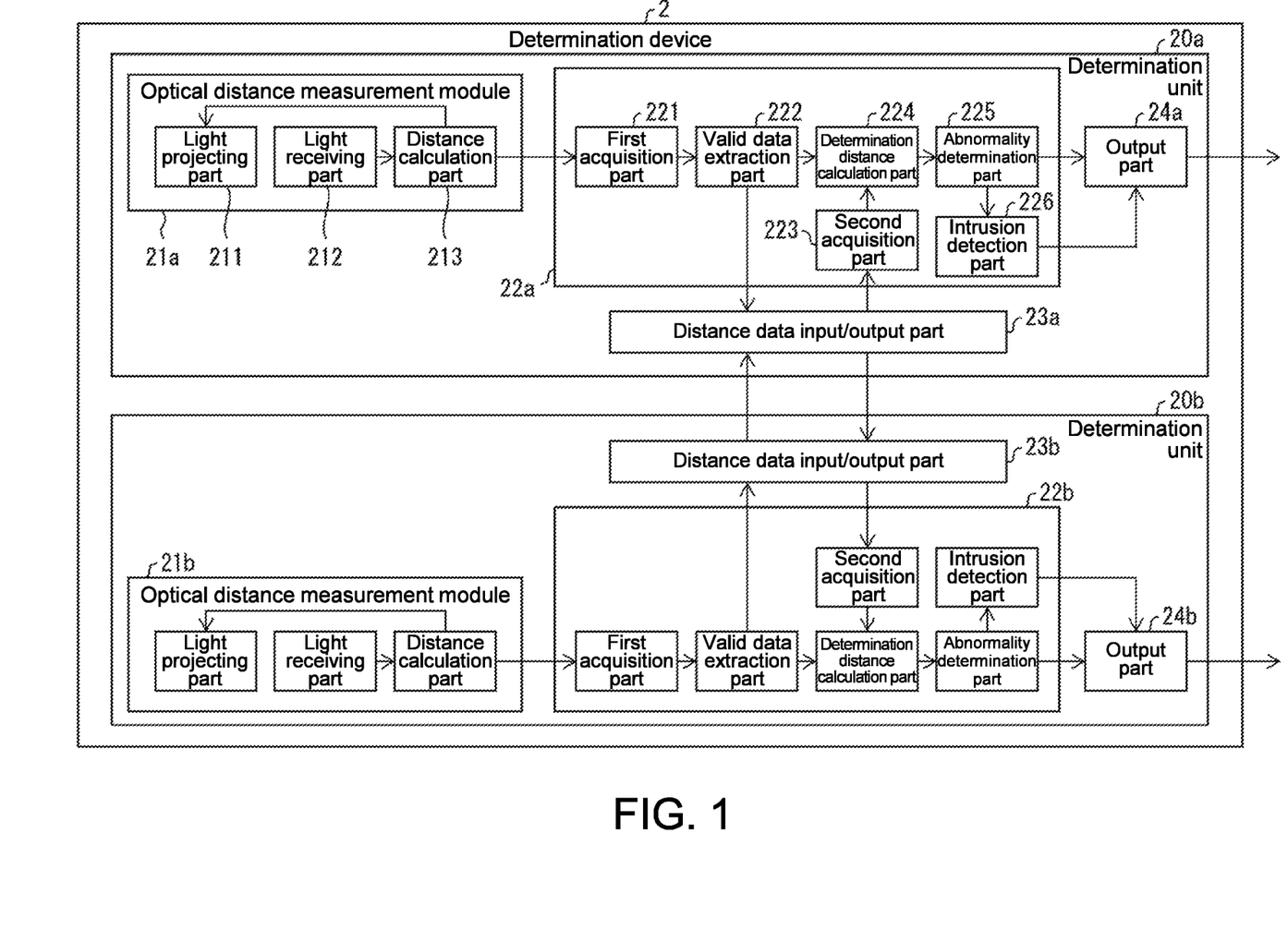
FIG. 1 is a block diagram showing an example of the configuration of main parts of the determination device according to an embodiment of the disclosure.

FIG. 1 is a block diagram showing an example of the configuration of main parts of the determination device 2 according to the present embodiment. As shown in FIG. 1, the determination device 2 includes the determination unit 20a and the determination unit 20b. The determination unit 20b has a configuration that is paired with the determination unit 20a and is the same as the determination unit 20a. Therefore, only the configuration of the determination unit 20a will be described in detail and details of the configuration of the determination unit 20b will be omitted.

The determination unit 20a includes the optical distance measurement module 21a, the control part 22a, the distance data input/output part 23a, and the output part 24a.

(Optical Distance Measurement Module 21a)

The optical distance measurement module 21a is a reflective sensor that includes a light projecting part 211 for projecting light and a light receiving part 212 for receiving reflected light of the light. In particular, in the present embodiment, the light receiving part 212 is a multi-pixel light receiving part that includes a plurality of light receiving elements. The optical distance measurement module 21a also includes a distance calculation part 213. The distance calculation part 213 acquires a signal indicating light reception from the light receiving part 212. The distance calculation part 213 measures the time required for the light projected from the light projecting part 211 to be reflected by the object under measurement and received by the light receiving elements of the light receiving part 212 or the phase difference, and calculates the distance to the object under measurement by arithmetic processing for each light receiving element of the light receiving part 212. That is, the distance calculation part 213 calculates the distance according to a signal outputted by the light receiving element. The distance calculation part 213 outputs a signal indicating the distance between the object in the observation area of the optical distance measurement module 21a and the optical distance measurement module 21a, which is calculated according to the signal outputted by each light receiving element, to a first acquisition part 221 of the control part 22a.

According to the above configuration, the determination device 2 can distinguish the signal outputted by a light receiving element that performs optical distance measurement in the overlapping observation area and the signal outputted by a light receiving element that performs optical distance measurement in the non-overlapping observation area in a plurality of optical distance measurement sensors, and acquire the signals.

The optical distance measurement module 21a may have a configuration in which the light projecting part 211, the light receiving part 212, and the distance calculation part 213 are not integrated but separated. According to the above configuration, in the case where a general-purpose optical distance measurement module is used as the optical distance measurement module 21a, the selection range of applicable optical distance measurement modules can be expanded.

(Control Part 22a)

The control part 22a includes a CPU (Central Processing Unit), a RAM (Random Access Memory), a ROM (Read Only Memory), etc., and controls each component according to information processing. The control part 22a includes the first acquisition part (acquisition part) 221, a valid data extraction part (extraction part) 222, a second acquisition part (acquisition part) 223, a determination distance calculation part 224, an abnormality determination part 225, and an intrusion detection part 226.

(First Acquisition Part 221)

The first acquisition part 221 acquires the signal outputted by the optical distance measurement module 21a in the sensor set including the optical distance measurement module 21a and the optical distance measurement module 21b that have observation areas overlapping each other. The first acquisition part 221 outputs the acquired signal to the valid data extraction part 222.

(Valid Data Extraction Part 222)

The valid data extraction part 222 extracts light receiving elements corresponding to the overlapping observation area R3 of the optical distance measurement modules 21a and 21b, among the light receiving elements of the light receiving part 212, as light receiving elements in a valid range. More specifically, the valid data extraction part 222 extracts the light receiving elements corresponding to the observation area R3, among the light receiving elements of each of the light receiving parts 212 of the optical distance measurement modules 21a and 21b, as the light receiving elements in the valid range. Hereinafter, "extraction of the light receiving elements corresponding to the observation area R3 (i.e. the light receiving elements in the valid range)" performed by the valid data extraction part 222 is also referred to as "setting of the valid range".

Here, in particular, the valid data extraction part 222 sets the valid range for the multiple pixels of the light receiving part 212 according to the distance between the object under measurement in the observation area and the optical distance measurement module 21a or the optical distance measurement module 21b. That is, the valid data extraction part 222 extracts the light receiving elements in the valid range for each of the light receiving parts 212 according to the distance between the object under measurement in the observation area and the optical distance measurement module 21a or the optical distance measurement module 21b.

If there are light receiving elements included in the set valid range, the valid data extraction part 222 extracts a signal indicating the distance calculated according to the signal outputted by the light receiving element as valid data.

The valid data extraction part 222 outputs the extracted signal to the determination distance calculation part 224. Further, the valid data extraction part 222 outputs the extracted signal to the determination unit 20b via the distance data input/output part 23a.

Here, the light receiving region on the light receiving part 212 where the light reflected by the object under measurement in the overlapping observation area is received will be described with reference to FIG. 3(a) to FIG. 3(c). FIG. 3(b) shows the light receiving region on the light receiving part 212 for the light reflected by the object under measurement in the overlapping observation area at the position P1 shown in FIG. 3(a) as a region R10. FIG. 3(c) shows the light receiving region on the light receiving part 212 for the light reflected by the object under measurement in the overlapping observation area at the position P2 shown in FIG. 3(a) as a region R20. As shown in FIG. 3(a) to FIG. 3(c), the light receiving region on the light receiving part 212 for the light reflected by the object under measurement in the overlapping observation area changes according to the distance from the optical distance measurement module to the object under measurement. Specifically, the light receiving region becomes narrower as the distance from the optical distance measurement module to the object under measurement decreases, and the light receiving region becomes wider as the distance from the optical distance measurement module to the object under measurement increases.

Figure 4A:
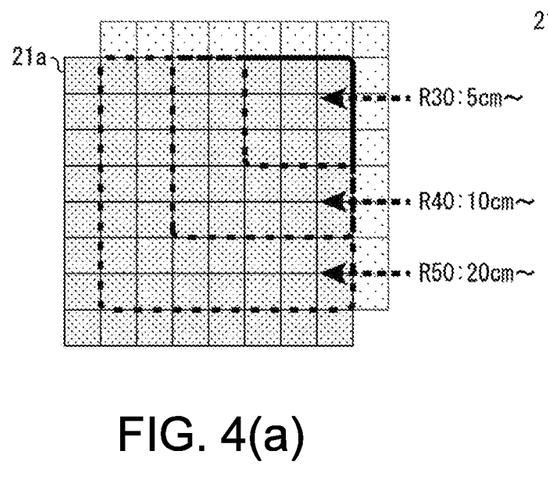
FIG. 4(a) and FIG. 4(b) show an example of the valid data extraction part performing extraction of a signal indicating the distance between the object under measurement and the optical distance measurement sensor in the observation area according to an embodiment of the disclosure.
Figure 4B:
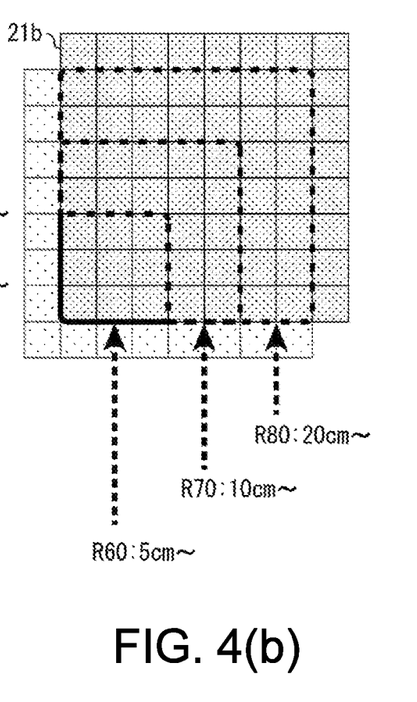

FIG. 4(a) and FIG. 4(b) are diagrams showing an example of the valid data extraction part 222 performing extraction of a signal indicating the distance between the object under measurement in the observation area and the optical distance measurement sensor. Here, a specific example of the extraction of a signal indicating the distance between the object under measurement in the observation area and the optical distance measurement sensor, preformed by the valid data extraction part 222, will be described. When a signal indicating the distance calculated according to the signal outputted by a certain light receiving element is inputted to the valid data extraction part 222, the valid data extraction part 222 sets a valid range in the light receiving part 212 according to the distance indicated by the signal.

FIG. 4(a) is a diagram showing an example of extraction of a signal indicating the distance between the object under measurement and the optical distance measurement sensor in the optical distance measurement module 21a. For example, as shown in FIG. 4(a), in the case where the distance indicated by the received signal is 5 cm or more, the valid data extraction part 222 sets the region R30 as the measurement valid region of the light receiving part 212. The region R30, which is the valid measurement range, is the region on the light receiving part 212 where the light reflected by the object under measurement in the overlapping observation area is received. If the received signal is "a signal generated based on the signal outputted by a light receiving element included in the region R30", the valid data extraction part 222 extracts the signal.

Similarly, in the case where the distance indicated by the received signal is 10 cm or more, the valid data extraction part 222 further sets a region R40 in addition to the region R30 as the measurement valid region of the light receiving part 212. If the received signal is "a signal generated based on the signal outputted by a light receiving element included in the region R30 or the region R40", the valid data extraction part 222 extracts the signal. In addition, in the case where the distance indicated by the received signal is 20 cm or more, the valid data extraction part 222 further sets a region R50 in addition to the region R30 and the region R40 as the measurement valid region of the light receiving part 212. If the received signal is "a signal generated based on the signal outputted by a light receiving element included in the region R30, the region R40, or the region R50", the valid data extraction part 222 extracts the signal.

FIG. 4(b) is a diagram showing an example of extraction of a signal indicating the distance between the object under measurement and the optical distance measurement sensor in the optical distance measurement module 21b. For example, as shown in FIG. 4(b), in the case where the distance indicated by the received signal is 5 cm or more, the valid data extraction part 222 sets a region R60 as the measurement valid region of the light receiving part 212. The region R60, which is the valid range, is the region on the light receiving part 212 where the light reflected by the object under measurement in the overlapping observation area is received. If the received signal is "a signal generated based on the signal outputted by a light receiving element included in the region R60", the valid data extraction part 222 extracts the signal.

Similarly, in the case where the distance indicated by the received signal is 10 cm or more, the valid data extraction part 222 further sets a region R70 in addition to the region R60 as the measurement valid region of the light receiving part 212. If the received signal is "a signal generated based on the signal outputted by a light receiving element included in the region R70", the valid data extraction part 222 extracts the signal. In addition, in the case where the distance indicated by the received signal is 20 cm or more, the valid data extraction part 222 further sets a region R80 in addition to the region R60 and the region R70 as the measurement valid region of the light receiving part 212. If the received signal is "a signal generated based on the signal outputted by a light receiving element included in the region R80", the valid data extraction part 222 extracts the signal.

(Second Acquisition Part 223)

The second acquisition part 223 acquires the signal outputted by the optical distance measurement module 21b in the sensor set including the optical distance measurement module 21a and the optical distance measurement module 21b that have observation areas overlapping each other. Specifically, the signal extracted by the valid data extraction part 222 of the determination unit 20b is acquired via the distance data input/output part 23a. The second acquisition part 223 outputs the acquired signal to the determination distance calculation part 224.

In other words, the second acquisition part 223 acquires a signal indicating the distance between the object in the observation area and the optical distance measurement sensor corresponding to each of the light receiving elements of the optical distance measurement module 21b.

(Determination Distance Calculation Part 224)

The determination distance calculation part 224 calculates a determination distance, which is to be used for the determination described later (comparison process) performed by the abnormality determination part 225, from the distance indicated by the signal extracted by the valid data extraction part 222, and notifies the abnormality determination part 225 of the calculated determination distance. Specifically, the determination distance calculation part 224 of the control part 22a calculates the distance (determination distance) between the optical distance measurement module 21a and the object under measurement from the distance indicated by the signal extracted by the valid data extraction part 222 of the determination unit 20a. In addition, the determination distance calculation part 224 of the control part 22a calculates the distance (determination distance) between the optical distance measurement module 21b and the object under measurement from the distance indicated by the signal extracted by the valid data extraction part 222 of the determination unit 20b.

Here, as described above, in order to prevent erroneous determination of an abnormality, the abnormality determination part 225 determines whether there is an abnormality by the difference between the distances (that is, determination distances) from the object present in the overlapping observation area R3 to the optical distance measurement modules 21a and 21b respectively. In addition, the light receiving part 212 is a multi-pixel light receiving part, and there are a plurality of pieces of distance data. For facilitating execution of the abnormality determination processing (that is, the comparison process of two determination distances) performed by the abnormality determination part 225, the determination distance calculation part 224 may execute the following processing.

For example, the determination distance calculation part 224 may calculate the determination distance by calculating the average value of the distances indicated by the signals generated according to the signals outputted by the respective light receiving elements. In addition, the determination distance calculation part 224 may determine the minimum value of the distances indicated by the signals generated according to the signals outputted by the respective light receiving elements as the determination distance. Further, the determination distance calculation part 224 may calculate a statistical value from the distances indicated by the signals generated according to the signals outputted by the respective light receiving elements to calculate the determination distance. Nevertheless, the method that the determination distance calculation part 224 adopts to calculate or determine the determination distance is not particularly limited as long as it uses the distance indicated by the extracted signal.

The determination distance calculation part 224 outputs to the abnormality determination part 225 a signal indicating the calculated determination distance (specifically, the "determination distance between the optical distance measurement module 21a and the object under measurement" and the "determination distance between the optical distance measurement module 21b and the object under measurement").

(Abnormality Determination Part 225)

The abnormality determination part 225 determines that an abnormality has occurred in at least one of the optical distance measurement modules 21a and 21b when the distances respectively indicated by the signals received by the first acquisition part 221 and the second acquisition part 223 deviate from each other by the predetermined length or more. Each of the abnormality determination parts 225 included in the determination unit 20a and the determination unit 20b performs the determination.

If the abnormality determination part 225 determines that an abnormality has occurred in at least one of the optical distance measurement modules 21a and 21b, the abnormality determination part 225 notifies the output part 24a of the determination result that an abnormality has occurred, and fixes the output of the output part 24a to the safe side.

However, if the distances respectively indicated by the signals received by the first acquisition part 221 and the second acquisition part 223 do not deviate from each other by the predetermined length or more, the abnormality determination part 225 determines that no abnormality occurs in any of the optical distance measurement modules 21a and 21b. Then, the abnormality determination part 225 notifies the intrusion detection part 226 of the determination result that no abnormality occurs, for the intrusion detection part 226 to execute the intrusion determination processing.

Specifically, each of the abnormality determination parts 225 of the control part 22a and the control part 22b determines whether an abnormality has occurred in at least one of the optical distance measurement modules 21a and 21b by using the signals outputted by the light receiving elements in the valid range (the light receiving elements corresponding to the observation area R3).

More specifically, the abnormality determination part 225 calculates the difference between the "determination distance between the optical distance measurement module 21a and the object under measurement" and the "determination distance between the optical distance measurement module 21b and the object under measurement" received from the determination distance calculation part 224 (comparison process). If the difference calculated in the comparison process is equal to or larger than the predetermined length (not in the allowable range), the abnormality determination part 225 determines that an abnormality has occurred in at least one of the optical distance measurement modules 21a and 21b. However, if the difference calculated in the comparison process is smaller than the predetermined length (in the allowable range), the abnormality determination part 225 determines that no abnormality occurs in any of the optical distance measurement modules 21a and 21b. As described above, the determination distance is calculated by the signal indicating the distance generated by the signal outputted by the light receiving element. Therefore, it can be said that the determination is performed using the signal outputted by the light receiving element.

(Intrusion Detection Part 226)

The intrusion detection part 226 executes the intrusion determination processing when being notified of the determination result that "no abnormality occurs in any of the optical distance measurement modules 21a and 21b" by the abnormality determination part 225.

That is, the intrusion detection part 226 determines whether at least one of the distances respectively indicated by the signals outputted by the optical distance measurement modules 21a and 21b (in particular, the two determination distances calculated by the determination distance calculation part 224) is equal to or smaller than a predetermined value. If at least one of the two determination distances is equal to or smaller than the predetermined value, the intrusion detection part 226 outputs a signal indicating intrusion detection to the external device such as the safety control device 3 via the output part 24a. When the external device such as the safety control device 3 receives the signal indicating intrusion detection, the external device stops the driving of the movable part such as the end effector of the robot, that is, stops the operation of the machine, for example. Moreover, if both of the two determination distances are larger than the predetermined value, the intrusion detection part 226 may output a signal indicating that no intrusion has been detected to the external device such as the safety control device 3 via the output part 24a.

(Distance Data Input/Output Part 23a)

The distance data input/output part 23a inputs/outputs the signals extracted by the valid data extraction part 222 between the determination unit 20a and the determination unit 20b.

(Output Part 24a)

In accordance with the instruction of the intrusion detection part 226 or the abnormality determination part 225, the output part 24a outputs a signal indicating abnormality or a signal indicating intrusion detection to the safety control device 3.

For example, the "signal indicating intrusion detection" and the "signal indicating abnormality" may be the same signal. For example, the "signal indicating intrusion detection" or the "signal indicating abnormality" may be outputted to the safety control device 3 as a signal indicating ON/OFF of safety control.

§ 3 Operation Example (Example of Flow of Processing of Determination Device 2)

Figure 5:
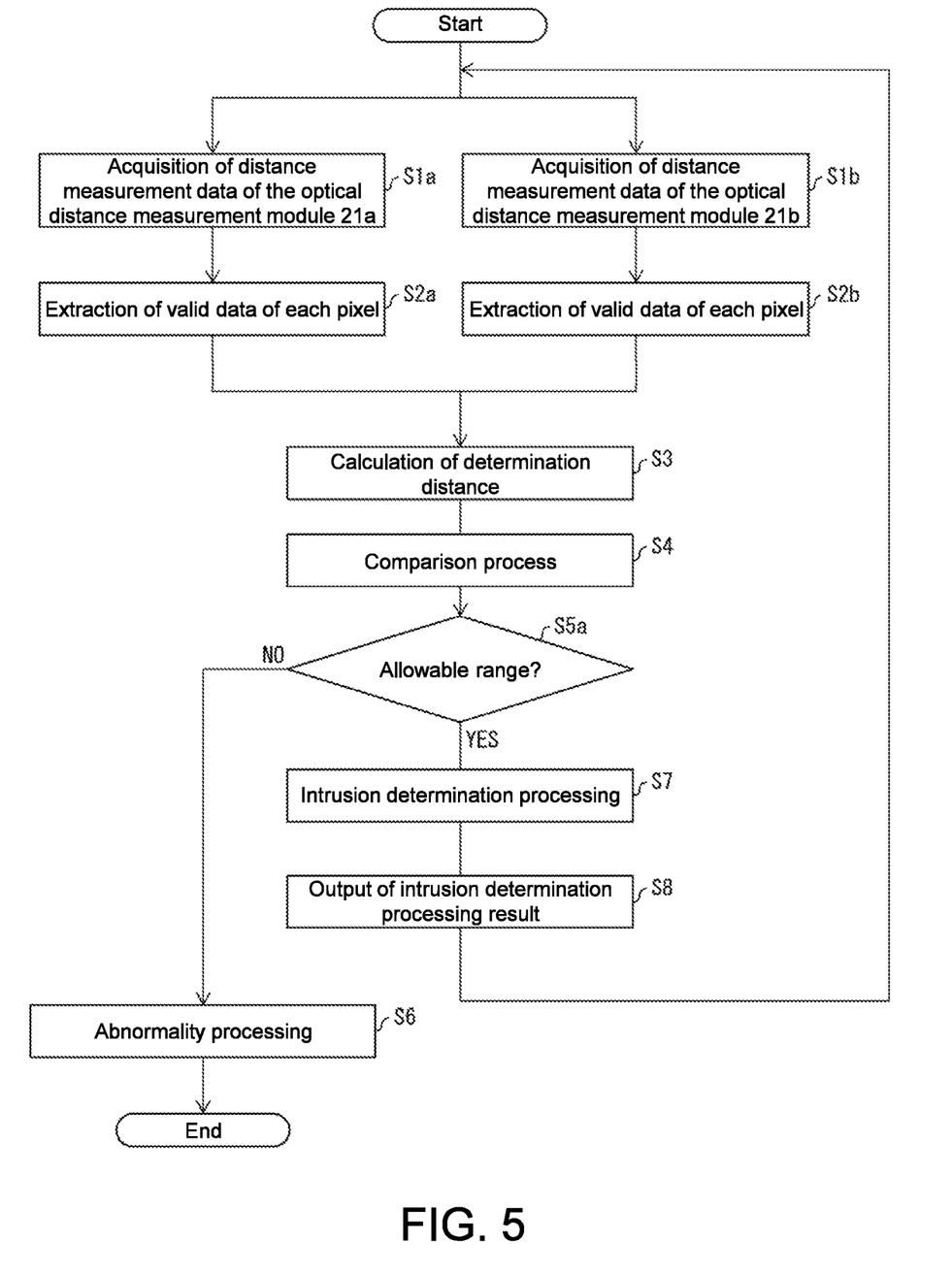
FIG. 5 is a flowchart showing an example of the flow of abnormality determination processing of the determination device according to an embodiment of the disclosure.

FIG. 5 is a flowchart showing an example of the flow of abnormality determination processing of the determination device 2. An example of the flow of abnormality determination processing of the determination device 2 will be described with reference to FIG. 5.

In the determination unit 20a, the first acquisition part 221 acquires the signal (distance measurement data) outputted by the optical distance measurement module 21a and indicating the distance between the object under measurement in the observation area of the optical distance measurement module 21a and the optical distance measurement module 21a (step S1a: acquisition step). Subsequently, in the determination unit 20a, the valid data extraction part 222 extracts valid data from the signal indicating the distance calculated according to the signal outputted by each of the light receiving elements (pixels) (step S2a).

In parallel with step S1a and step S2a, in the determination unit 20b, the first acquisition part 221 acquires the signal (distance measurement data) outputted by the optical distance measurement module 21b and indicating the distance between the object under measurement in the observation area of the optical distance measurement module 21b and the optical distance measurement module 21b (step S1b: acquisition step). Subsequently, in the determination unit 20b, the valid data extraction part 222 extracts valid data from the signal indicating the distance calculated according to the signal outputted by each of the light receiving elements (step S2b).

According to the above configuration, the determination device 2 can perform determination using the signals outputted by the light receiving elements that are capable of performing optical distance measurement in the overlapping observation area in a plurality of optical distance measurement sensors.

Following step S2a and step S2b, in the determination unit 20a and the determination unit 20b, the determination distance calculation part 224 calculates the determination distance to be used for the determination performed by the abnormality determination part 225 (step S3).

Subsequently, the following processing is performed in the determination unit 20a and the determination unit 20b.

The abnormality determination part 225 calculates the difference between the "determination distance between the optical distance measurement module 21a and the object under measurement" and the "determination distance between the optical distance measurement module 21b and the object under measurement" (S4: comparison process).

The abnormality determination part 225 determines that an abnormality has occurred in at least one of the optical distance measurement modules 21a and 21b if the difference calculated in the comparison process S4 is the "predetermined length or more", that is, "not in the allowable range (NO in S5a)", (abnormality determination step). Then, the abnormality determination part 225 outputs a signal indicating abnormality to the safety control device 3 via the output part 24a (step S6: abnormality process, output step), and ends the processing.

The abnormality determination part 225 determines that no abnormality occurs in any of the optical distance measurement modules 21a and 21b if the difference calculated in the comparison process S4 is "smaller than the predetermined length", that is, "in the allowable range (YES in S5a)". Then, the abnormality determination part 225 notifies the intrusion detection part 226 of the determination result that "no abnormality occurs in any of the optical distance measurement modules 21a and 21b".

The intrusion detection part 226 executes intrusion determination processing (step S7) and outputs the execution result of the intrusion determination processing to the safety control device 3 (step S8). In other words, the intrusion detection part 226 determines whether at least one of the "determination distance between the optical distance measurement module 21a and the object under measurement" and the "determination distance between the optical distance measurement module 21b and the object under measurement" is equal to or smaller than the predetermined value. If at least one of the two determination distances is equal to or smaller than the predetermined value, the intrusion detection part 226 outputs a signal indicating intrusion detection to the safety control device 3 via the output part 24a, and the processing returns to step S1a and step S1b. However, if both of the two determination distances are larger than the predetermined value, the abnormality determination part 225 outputs a signal indicating that no intrusion has been detected to the external device such as the safety control device 3 via the output part 24a, and the processing returns to step S1a and step S1b.

(Configuration for Preventing Erroneous Determination Related to Abnormality)

As shown in FIG. 3(a) to FIG. 3(c), in the configuration that the observation areas of a plurality of optical distance measurement modules overlap each other, there is an area where the observation areas of the optical distance measurement modules do not overlap. If the object under measurement remains in this non-overlapping area, one optical distance measurement module calculates the distance of the object under measurement and outputs a signal while the other optical distance measurement module does not calculate the distance of the object under measurement. Therefore, inconsistency occurs between the distances indicated by the signals outputted by the multiple optical distance measurement modules. When such inconsistency occurs, the following problem arises with the determination device which determines that "an abnormality such as malfunction of the optical distance measurement module has occurred". That is, if the object under measurement remains in the area where the observation areas do not overlap, even though the optical distance measurement module does not have malfunction, the determination device may determine that "an abnormality has occurred" and output a signal indicating abnormality.

In order to solve the above problem, the determination device 2 adopts the following configuration for the abnormality determination part 225 which determines that "an abnormality has occurred in at least one of the optical distance measurement modules" when inconsistency occurs in the measurement data of multiple optical distance measurement modules.

That is, the abnormality determination part 225 compares the "determination distance between the optical distance measurement module 21a and the object under measurement" and the "determination distance between the optical distance measurement module 21b and the object under measurement" indicated by the signals received from the determination distance calculation part 224. Then, if the difference between the "determination distance between the optical distance measurement module 21a and the object under measurement" and the "determination distance between the optical distance measurement module 21b and the object under measurement" is within the predetermined range, the abnormality determination part 225 determines that no abnormality occurs in any of the optical distance measurement modules 21a and 21b.

Here, the two determination distances are calculated by the determination distance calculation part 224 from the valid data that is extracted by the valid data extraction part 222 described in the first embodiment. Therefore, the signal indicating the distance calculated in the area where the observation areas do not overlap is not used in the calculation of the determination distance. In other words, the abnormality determination part 225 compares the determination distances from the optical distance measurement modules 21a and 21b to the object under measurement by using the signals outputted by the light receiving elements corresponding to the overlapping observation area R3 of the optical distance measurement modules 21a and 21b. Accordingly, the determination device 2 can prevent "erroneously determining that an abnormality has occurred because the distances respectively measured by the optical distance measurement modules 21a and 21b in the non-overlapping observation area deviate by the predetermined length or more".

§ 4 Modified Example

Other modified examples of the disclosure will be described as follows with reference to FIG. 6 and FIG. 7. For convenience of description, members that have the same functions as those described in the above embodiment are denoted by the same reference numerals and descriptions thereof are omitted.

The above embodiment illustrates an example that the determination device 2 includes one sensor set in which the observation areas overlap each other.

A determination device 2c according to this modified example includes a plurality of sets of multiple optical distance measurement modules that have observation areas overlapping each other.

Figure 6:
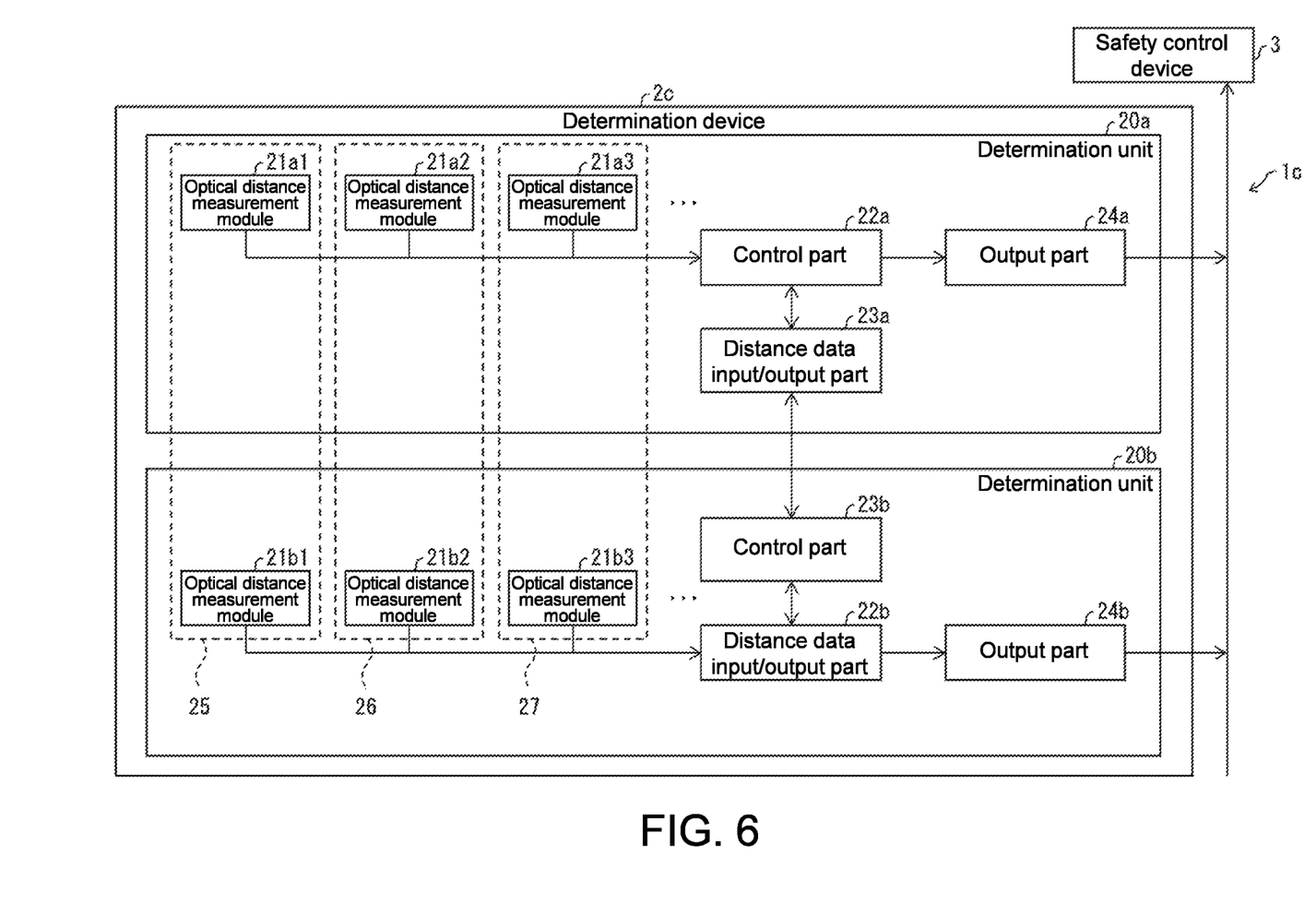
FIG. 6 is a diagram showing an example of application of the determination device according to a modified example of the disclosure.

FIG. 6 is a diagram showing an example of application of the determination device 2c according to this modified example in a safety control system 1c. As shown in FIG. 6, the safety control system 1c includes the determination device 2c and the safety control device 3.

Figure 7:
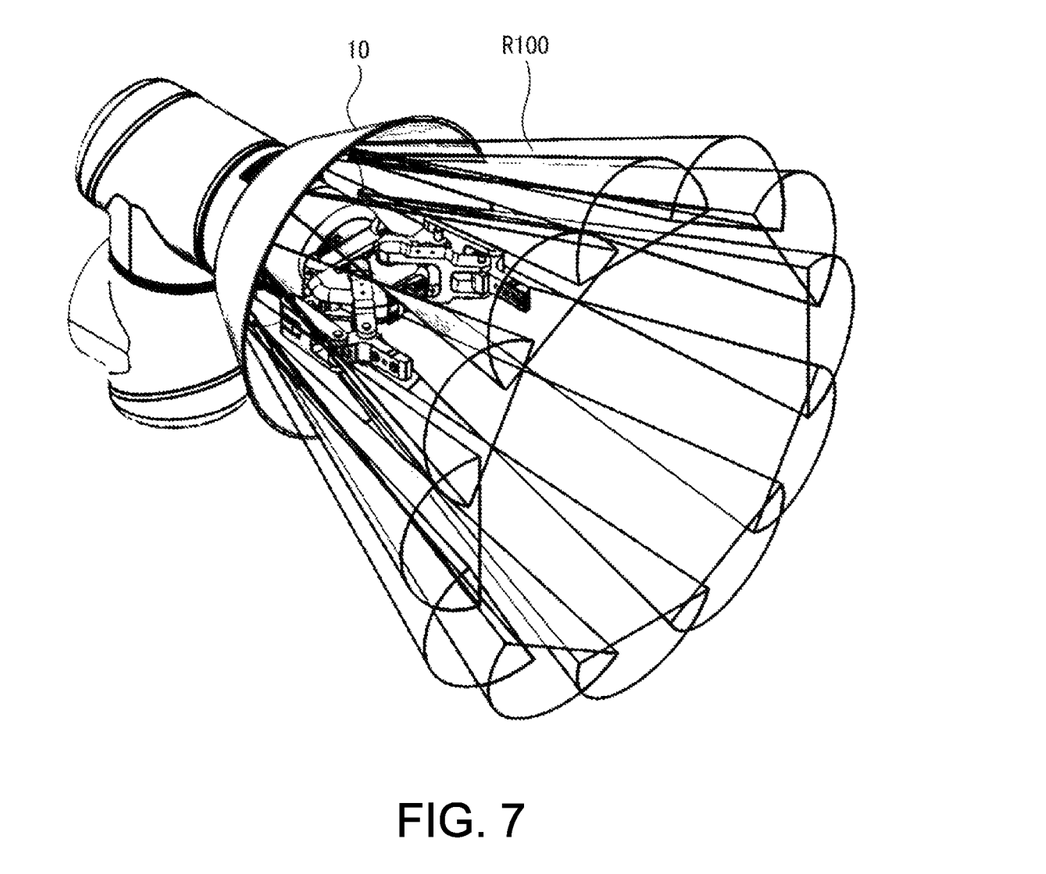
FIG. 7 is a diagram showing an example of an end effector of a robot provided with the determination device according to a modified example of the disclosure.

FIG. 7 is a diagram showing an example of an end effector of a robot 10 including the determination device 2c. The observation area R100 shown in FIG. 7 represents the overlapping observation areas of multiple optical distance measurement modules. As shown in FIG. 7, a plurality of the overlapping observation areas are set around the end effector of the robot 10.

As shown in FIG. 6, the determination unit 20a of the determination device 2c includes a plurality of optical distance measurement modules and at least includes the optical distance measurement modules 21a1, 21a2, and 21a3. The determination unit 20b of the determination device 2c also includes a plurality of optical distance measurement modules and at least includes the optical distance measurement modules 21b1, 21b2, and 21b3.

The optical distance measurement module 21a1 and the optical distance measurement module 21b1 have an overlapping observation area and are included in the optical distance measurement module set 25.

The optical distance measurement module 21a2 and the optical distance measurement module 21b2 have an overlapping observation area and are included in the optical distance measurement module set 26.

The optical distance measurement module 21a3 and the optical distance measurement module 21b3 have an overlapping observation area and are included in the optical distance measurement module set 27.

Each of the optical distance measurement modules outputs a signal indicating the distance between the object in the observation area of the optical distance measurement module and the optical distance measurement module to the control part 22a or the control part 22b by serial transmission for each set.

In other words, the determination device 2 has multiple sensor sets. In addition, the signals outputted by the optical distance measurement sensors of each of the sensor sets are transmitted by serial transmission to the first acquisition parts 221 of the control part 22a and the control part 22b respectively.

According to the above configuration, the control part 22a and the control part 22b acquire the outputted signals by serial transmission. Therefore, the number of lines of the determination device 2c can be reduced. Thus, the manufacturing cost of the determination device 2c can be reduced.

The modified example and the above embodiment illustrate a configuration including two optical distance measurement sensors as the sensor set that includes a plurality of optical distance measurement sensors having observation areas overlapping each other. However, it may be appropriately changed to a configuration including three or more optical distance measurement sensors. In that case, the number of the determination units may be changed appropriately according to the optical distance measurement sensors.

(Example of Implementation by Software)

The control blocks (in particular, the control part 22a and the control part 22b) of the determination device 2, 2c may be realized by a logic circuit (hardware) formed in an integrated circuit (IC chip) or the like, or may be realized by software.

In the latter case, the determination device 2, 2c is provided with a computer for executing commands of a program which is software for realizing each function. The computer includes one or more processors and includes a computer readable recording medium storing the program, for example. Then, in the computer, the processor reads the program from the recording medium and executes the program, so as to achieve the disclosure. A CPU (Central Processing Unit) can be used as the processor, for example. In addition to a "non-temporary tangible medium" such as a ROM (Read Only Memory), a tape, a disk, a card, a semiconductor memory, a programmable logic circuit or the like can be used as the recording medium. Further, a RAM (Random Access Memory) or the like may be included for developing the program. In addition, the program may be provided to the computer via any transmission medium (such as a communication network or a broadcast wave) that is capable of transmitting the program. An embodiment of the disclosure can also be realized in the form of a data signal embedded in a carrier wave, in which the program is embodied by electronic transmission.

Nevertheless, the disclosure is not limited to the above-described embodiments, and various modifications can be made within the scope defined by the claims. Embodiments obtained by appropriately combining the technical means disclosed in different embodiments are also included in the technical scope of the disclosure.

What is claimed is:

1. A determination device for outputting a signal indicating intrusion detection when a distance to an object is within a predetermined range, the determination device comprising:
a plurality of acquisition parts each acquiring a signal outputted by each of a plurality of optical distance measurement sensors that are included in a sensor set and have observation areas only partially overlapping each other, wherein the observation areas are field of views of the plurality of optical distance measurement sensors, respectively;
a plurality of abnormality determination processors each determining that an abnormality has occurred in at least one of the optical distance measurement sensors when distances respectively indicated by the signals received by the acquisition parts deviate from each other by a predetermined length or more; and
an output part outputting a signal indicating the abnormality when at least one of the abnormality determination processors determines that the abnormality has occurred,
wherein the optical distance measurement sensor comprises a multi-pixel light receiving part comprising a plurality of light receiving elements,
wherein the determination device further comprises an extraction processor extracting light receiving elements corresponding to an overlapping observation area of the optical distance measurement sensors, among the light receiving elements of the light receiving part, as light receiving elements in a valid range,
wherein each of the abnormality determination processors determines whether the abnormality has occurred in at least one of the optical distance measurement sensors by using signals outputted by the light receiving elements in the valid range, and
wherein the extraction processor extracts the light receiving elements in the valid range according to a distance between the object in the observation area and the optical distance measurement sensor.

2. The determination device according to claim 1, wherein a plurality of the sensor sets is provided, and
the signals outputted by the optical distance measurement sensors of each of the sensor sets are transmitted to each of the acquisition parts by serial transmission.

3. A control method of a determination device for outputting a signal indicating intrusion detection when a distance to an object is within a predetermined range, the control method comprising:

a plurality of acquisition steps each acquiring a signal outputted by each of a plurality of optical distance measurement sensors that are included in a sensor set and have observation areas only partially overlapping each other, wherein the observation areas are field of views of the plurality of optical distance measurement sensors, respectively;
a plurality of abnormality determination steps each determining that an abnormality has occurred in at least one of the optical distance measurement sensors when distances respectively indicated by the signals received in the acquisition steps deviate from each other by a predetermined length or more, wherein the plurality of abnormality determination steps are performed by a plurality of abnormality determination processors; and
an output step outputting a signal indicating the abnormality when at least one of the abnormality determination steps determines that the abnormality has occurred,
wherein the optical distance measurement sensor comprises a multi-pixel light receiving part comprising a plurality of light receiving elements,
wherein the control method further comprises an extraction step extracting light receiving elements corresponding to an overlapping observation area of the optical distance measurement sensors, among the light receiving elements of the light receiving part, as light receiving elements in a valid range,
wherein each of the abnormality determination processors determines whether the abnormality has occurred in at least one of the optical distance measurement sensors by using signals outputted by the light receiving elements in the valid range, and
wherein the extraction step extracts the light receiving elements in the valid range according to a distance between the object in the observation area and the optical distance measurement sensor.

* * * * *